US012606577B2

(12) United States Patent
Yang

(10) Patent No.: US 12,606,577 B2
(45) Date of Patent: Apr. 21, 2026

(54) IODOALKYL TIN COMPOUNDS AND PREPARATION METHODS THEREOF

(71) Applicants: Gelest, Inc., Morrisville, PA (US); Mitsubishi Chemical Corporation, Tokyo (JP)

(72) Inventor: Li Yang, Belle Mead, NJ (US)

(73) Assignees: GELEST, INC., Morrisville, PA (US); MITSUBISHI CHEMICAL CORPORATION, Tokyo (JP)

( * ) Notice: Subject to any disclaimer, the term of this patent is extended or adjusted under 35 U.S.C. 154(b) by 462 days.

(21) Appl. No.: 18/372,922

(22) Filed: Sep. 26, 2023

(65) Prior Publication Data

US 2024/0116957 A1 Apr. 11, 2024

Related U.S. Application Data

(60) Provisional application No. 63/411,681, filed on Sep. 30, 2022, provisional application No. 63/410,692, filed on Sep. 28, 2022.

(51) Int. Cl.
*C07F 7/22* (2006.01)

(52) U.S. Cl.
CPC .................................. *C07F 7/2224* (2013.01)

(58) Field of Classification Search
CPC .................................................... C07F 7/2224
See application file for complete search history.

(56) References Cited

U.S. PATENT DOCUMENTS 2,592,926 A 4/1952 Mack et al.
2,602,651 A 7/1952 Cannon
3,417,116 A 12/1968 Considine et al.
3,470,220 A 9/1969 Moedritzer et al.
3,519,666 A 7/1970 Pellegrini et al.
3,590,060 A 6/1971 Murch
3,976,672 A 8/1976 Strunk et al.
4,370,028 A 1/1983 Bernhardt
4,556,725 A 12/1985 Kanner et al.
4,696,837 A 9/1987 Lindner
5,075,468 A 12/1991 Frances et al.
5,123,998 A 6/1992 Kishimura
5,274,149 A 12/1993 Calbick et al.
5,698,262 A 12/1997 Soubeyrand et al.
6,022,822 A 2/2000 Noyori
6,100,415 A 8/2000 Takamatsu et al.
6,162,756 A 12/2000 Friebe et al.
6,271,329 B1 8/2001 Kristen et al.
6,861,544 B1 3/2005 Curran et al.
6,984,591 B1 1/2006 Buchanan et al.
7,045,451 B2 5/2006 Shenai-Khatkhate
7,384,872 B2 6/2008 Hwang et al.
7,413,776 B2 8/2008 Shenai-Khatkhate et al.
7,683,004 B2 3/2010 Feldman et al.
7,745,102 B2 6/2010 Fedynyshyn et al.
7,767,840 B2 8/2010 Shenai-Khatkhate et al.
7,919,423 B2 4/2011 Feldman et al.
8,008,518 B2 8/2011 Shinohata et al.
8,415,000 B2 4/2013 Stowers et al.
8,454,928 B2 6/2013 Dussarrat
8,563,231 B2 10/2013 Wang et al.
8,901,335 B2 12/2014 Modtland et al.
9,085,594 B2 7/2015 Modtland et al.
9,310,684 B2 4/2016 Meyers et al.
10,732,505 B1 8/2020 Meyers et al.
10,787,466 B2 9/2020 Edson et al.
10,862,199 B1 12/2020 Zhang et al.
11,079,676 B2 8/2021 Asano et al.
11,156,915 B2 10/2021 Tsubaki et al.
11,300,876 B2 4/2022 Jiang et al.
11,459,656 B1 10/2022 Arkles et al.
11,500,284 B2 11/2022 Meyers et al.
11,697,660 B2 7/2023 Kuiper et al.
12,060,377 B2 8/2024 Yang et al.
2001/0001796 A1 5/2001 Lynch et al.
2003/0015249 A1 1/2003 Jursich
(Continued)

FOREIGN PATENT DOCUMENTS

CA 3080934 A1 10/2019
CN 102212079 A 10/2011
(Continued)

OTHER PUBLICATIONS

H. Brown et al., 44 Tetrahedron, 2751-2762 (1988) (Year: 1988).*
M. Smith et al., e-EROS Encyclopedia of Reagents for Organic Synthesis, 1-16 (2013) (Year: 2013).*
P. Kropp et al., 115 Journal of the American Chemical Society, 3071-3079 (1993) (Year: 1993).*
K. Field et al., 64 Journal of Chemical Education, 269-271 (1987) (Year: 1987).*
Office Action issued Nov. 7, 2024 in U.S. Appl. No. 18/205,009 by Yang.
Office Action issued Nov. 20, 2023 in U.S. Appl. No. 18/205,009 by Yang et al.
Office Action issued Dec. 1, 2023 in U.S. Appl. No. 18/373,404, by Yang.
(Continued)

*Primary Examiner* — Alexander R Pagano
(74) *Attorney, Agent, or Firm* — Panitch Schwarze Belisario & Nadel LLP

(57) ABSTRACT

Methods for synthesizing iodoalkyl tin trialkoxide and diiodoalkyl tin trialkoxide compounds having the chemical formulas $R'Sn(OR)_3$ and $R''Sn(OR)_3$ are described. R' is a primary or secondary iodoalkyl group having about 2 to about 10 carbon atoms and containing at least one iodine atom, R" is a primary or secondary iodoalkyl group having about 2 to about 10 carbon atoms and containing two iodine atoms, and R is a primary, secondary, or tertiary alkyl group having about 1 to about 5 carbon atoms. The iodoalkyl tin compounds may be used for the formation of high-resolution EUV lithography patterning precursors and are attractive due to their desirable purity and low concentration of bisiodoalkyl and bisdiioodoalkyl impurities.

8 Claims, No Drawings

(56) References Cited

U.S. PATENT DOCUMENTS

| | | | |
|---|---|---|---|
| 2004/0077892 A1 | 4/2004 | Arkles et al. | |
| 2004/0202956 A1 | 10/2004 | Takahashi et al. | |
| 2007/0261735 A1 | 11/2007 | Yasumuro et al. | |
| 2009/0155546 A1 | 6/2009 | Yamashita et al. | |
| 2010/0270296 A1 | 10/2010 | Rauleder et al. | |
| 2011/0070371 A1 | 3/2011 | Gessert et al. | |
| 2011/0166268 A1 | 7/2011 | Deelman et al. | |
| 2011/0171382 A1 | 7/2011 | Gardiner et al. | |
| 2011/0212629 A1 | 9/2011 | Ivanov et al. | |
| 2011/0251354 A1 | 10/2011 | Marechal | |
| 2012/0053349 A1* | 3/2012 | Yoshino | A61P 7/02 546/114 |
| 2012/0070613 A1 | 3/2012 | Stowers et al. | |
| 2012/0223418 A1 | 9/2012 | Stowers et al. | |
| 2013/0066086 A1 | 3/2013 | Rogers | |
| 2014/0073785 A1 | 3/2014 | Burke et al. | |
| 2014/0119977 A1 | 5/2014 | Gatineau et al. | |
| 2014/0353648 A1 | 12/2014 | Abe et al. | |
| 2015/0056542 A1 | 2/2015 | Meyers et al. | |
| 2015/0064839 A1 | 3/2015 | Choi et al. | |
| 2015/0210430 A1 | 7/2015 | Naito et al. | |
| 2015/0221519 A1 | 8/2015 | Marks et al. | |
| 2015/0253667 A1 | 9/2015 | Bristol et al. | |
| 2016/0116839 A1 | 4/2016 | Meyers et al. | |
| 2017/0102612 A1 | 4/2017 | Meyers et al. | |
| 2019/0153001 A1 | 5/2019 | Cardineau et al. | |
| 2019/0308998 A1 | 10/2019 | Cardineau et al. | |
| 2019/0310552 A1 | 10/2019 | Asano et al. | |
| 2019/0315781 A1 | 10/2019 | Edson et al. | |
| 2019/0337969 A1 | 11/2019 | Odedra et al. | |
| 2019/0354010 A1 | 11/2019 | Minegishi et al. | |
| 2019/0391486 A1 | 12/2019 | Jiang et al. | |
| 2020/0239498 A1 | 7/2020 | Clark et al. | |
| 2020/0241413 A1 | 7/2020 | Clark et al. | |
| 2020/0326627 A1 | 10/2020 | Jiang et al. | |
| 2020/0348591 A1 | 11/2020 | Kim et al. | |
| 2020/0356000 A9 | 11/2020 | Minegishi et al. | |
| 2021/0013034 A1 | 1/2021 | Wu et al. | |
| 2021/0214379 A1 | 7/2021 | Odedra et al. | |
| 2021/0269461 A1 | 9/2021 | Kung et al. | |
| 2022/0002323 A1 | 1/2022 | Ermert et al. | |
| 2022/0064192 A1* | 3/2022 | Edson | C07F 7/2224 |
| 2022/0153763 A1 | 5/2022 | Ermert et al. | |
| 2022/0187705 A1 | 6/2022 | Jiang et al. | |
| 2022/0242888 A1 | 8/2022 | Kuiper et al. | |
| 2022/0306657 A1 | 9/2022 | Fabulyak et al. | |
| 2022/0342301 A1* | 10/2022 | Weidman | G03F 7/0042 |
| 2022/0402945 A1 | 12/2022 | Ermert et al. | |
| 2022/0402946 A1 | 12/2022 | Sim et al. | |
| 2023/0095666 A1 | 3/2023 | Arkles et al. | |
| 2023/0098280 A1 | 3/2023 | Kuiper | |
| 2023/0126125 A1 | 4/2023 | Ermert et al. | |
| 2023/0143592 A1 | 5/2023 | Jiang et al. | |
| 2023/0203068 A1 | 6/2023 | Pan et al. | |
| 2023/0220547 A1 | 7/2023 | Park et al. | |
| 2023/0279546 A1 | 9/2023 | Arkles et al. | |
| 2023/0303596 A1 | 9/2023 | Ermert et al. | |
| 2023/0374338 A1 | 11/2023 | Jilek et al. | |
| 2023/0391803 A1 | 12/2023 | Ermert et al. | |
| 2023/0391804 A1 | 12/2023 | Yang et al. | |
| 2024/0002412 A1 | 1/2024 | Ermert et al. | |
| 2024/0059717 A1 | 2/2024 | Yang et al. | |
| 2024/0124500 A1 | 4/2024 | Yang | |
| 2024/0158422 A1* | 5/2024 | Yang | C07F 7/2224 |
| 2024/0199658 A1* | 6/2024 | Jilek | C07F 7/2224 |
| 2024/0270764 A1 | 8/2024 | Fukui | |
| 2024/0280176 A1 | 8/2024 | Uehara et al. | |
| 2024/0336639 A1 | 10/2024 | Fukui et al. | |
| 2024/0376134 A1 | 11/2024 | Yang et al. | |
| 2024/0387173 A1 | 11/2024 | Liu et al. | |
| 2025/0101051 A1 | 3/2025 | Yang et al. | |
| 2025/0154178 A1 | 5/2025 | Yang et al. | |
| 2025/0155798 A1 | 5/2025 | Hioki et al. | |
| 2025/0179100 A1 | 6/2025 | Hioki | |
| 2025/0179101 A1 | 6/2025 | Tokumi et al. | |
| 2025/0222492 A1 | 7/2025 | Ishii et al. | |
| 2025/0222496 A1 | 7/2025 | Ishii et al. | |
| 2025/0388610 A1 | 12/2025 | Hayashi et al. | |

FOREIGN PATENT DOCUMENTS

| | | | | |
|---|---|---|---|---|
| CN | 103172653 A | | 6/2013 | |
| CN | 113534609 A | | 10/2021 | |
| CN | 115996934 A | | 4/2023 | |
| EP | 1166900 A2 | | 1/2002 | |
| EP | 0740757 B1 | | 9/2002 | |
| EP | 1491492 A1 | | 12/2004 | |
| EP | 1760085 A1 | | 3/2007 | |
| EP | 1983073 A1 | | 10/2008 | |
| JP | S61291592 A | | 12/1986 | |
| JP | H03120290 A | | 5/1991 | |
| JP | 2008-091215 A | | 4/2008 | |
| JP | 2008181796 A | | 8/2008 | |
| JP | 2012203061 A | | 10/2012 | |
| JP | 2018502173 A | | 1/2018 | |
| JP | 2019-500490 A | | 1/2019 | |
| JP | 2020122959 A | | 8/2020 | |
| JP | 2021-021953 A | | 2/2021 | |
| JP | 2021503482 A | | 2/2021 | |
| JP | 2021-519340 A | | 8/2021 | |
| JP | 2021523403 A | | 9/2021 | |
| JP | 2021528536 A | | 10/2021 | |
| JP | 2023-027078 A | | 3/2023 | |
| JP | 2023539735 A | | 9/2023 | |
| KR | 20210044593 A | | 4/2021 | |
| KR | 20210103950 A | | 8/2021 | |
| KR | 20210128793 A | | 10/2021 | |
| KR | 102382858 B1 | | 4/2022 | |
| TW | 223619 B | | 5/1994 | |
| TW | 201631377 A | | 9/2016 | |
| TW | 201831570 A | | 9/2018 | |
| TW | 202006168 A | | 2/2020 | |
| TW | 202028215 A | | 8/2020 | |
| TW | 202105087 A | | 2/2021 | |
| TW | 1752308 B | | 1/2022 | |
| TW | 202212970 A | | 4/2022 | |
| TW | 202230049 A | | 8/2022 | |
| TW | 202246293 A | | 12/2022 | |
| TW | 202300499 A | | 1/2023 | |
| TW | 202323261 A | | 6/2023 | |
| WO | 8607615 A1 | | 12/1986 | |
| WO | 8705037 A1 | | 8/1987 | |
| WO | 0195690 A1 | | 12/2001 | |
| WO | 0214328 A1 | | 2/2002 | |
| WO | 2003091186 A2 | | 11/2003 | |
| WO | 2009138474 A1 | | 11/2009 | |
| WO | 2012012026 A2 | | 1/2012 | |
| WO | 2013143745 A1 | | 10/2013 | |
| WO | 2013172466 A1 | | 11/2013 | |
| WO | 2014025937 A1 | | 2/2014 | |
| WO | 2017066319 A2 | | 4/2017 | |
| WO | 2017156388 A1 | | 9/2017 | |
| WO | 2018031896 A1 | | 2/2018 | |
| WO | 2018123388 A1 | | 7/2018 | |
| WO | 2018139109 A1 | | 8/2018 | |
| WO | 2019023797 A1 | | 2/2019 | |
| WO | 2019199467 A1 | | 10/2019 | |
| WO | 2020102085 A1 | | 5/2020 | |
| WO | 2020132281 A1 | | 6/2020 | |
| WO | 2020264557 A1 | | 12/2020 | |
| WO | 2020264571 A1 | | 12/2020 | |
| WO | WO-2022046736 A1 | * | 3/2022 | C07F 7/2284 |
| WO | 2022102636 A1 | | 5/2022 | |
| WO | 2022165381 A1 | | 8/2022 | |
| WO | 2023006871 A1 | | 2/2023 | |
| WO | 2023209506 A1 | | 11/2023 | |
| WO | 2023235534 A1 | | 12/2023 | |
| WO | WO-2023245047 A1 | * | 12/2023 | G03F 7/70033 |
| WO | 2024035914 A1 | | 2/2024 | |
| WO | 2024181551 A1 | | 9/2024 | |

(56) References Cited

FOREIGN PATENT DOCUMENTS

WO 2025054307 A2 3/2025
WO 2025170981 A2 8/2025

OTHER PUBLICATIONS

Ossig et al., "Synthesis and X-ray Crystal Structure of a Stannaimine," Journal of the Chemical Society, Chemical Communications, pp. 497-499 (1993).
Elhamzaoui et al., "A doubly folded spacer in a self-assembled hybrid material," Chem. Commun., pp. 1304-1306 (2006).
Notice of Allowance issued Jul. 24, 2024 in U.S. Appl. No. 18/373,404, by Yang.
International Search Report and Written Opinion issued Oct. 5, 2023 in Int'l Application No. PCT/US2023/024227.
Lorberth et al., "Evidence for Sn—N pi-Bonding: Dipole Moments of Aminostannanes," Journal of Organometallic Chemistry, vol. 19, pp. 203-206 (1969).
Eychenne-Baron et al., "Reaction of Butyltin Hydroxide Oxide with p-Toluenesulfonic Acid: Synthesis, X-ray Crystal Analysis, and Multinuclear NMR Characterization of {(BuSn)12O14(OH)6}(4-CH3C6H4SO3)2," Organometallics, vol. 19, pp. 1940-1949 (2000).
Eychenne-Baron et al., "New synthesis of the nanobuilding block {(BuSn) 12O14(OH)6}2+ and exchange properties of {(BuSn)12O14(OH)6}(O3SC6H4CH3)2", Journal of Organometallic Chemistry vol. 567, pp. 137-142 (1998).
Puff et al., "Zur Hydrolyse von Monoorganylzinn-trihalogeniden (III. Isolierung und Roentgenstrukturanalyse von Verbindungen mit dem neuartigen Kaefig-Ion[(i-PrSn)12O14(OH)6]2+", Journal of Organometallic Chemistry, vol. 373, pp. 173-184 (1989) (English Abstract Only).
Armarego, W.L.F., "Purification of Laboratory Chemicals," 6th Edition, Elsevier Inc., pp. xii-743 (2009).
Barreca et al., "MOCVD of SnO2 thin films from a new organometallic precursor," J. Phys. IV France, vol. 9, pp. Pr8-667-Pr8-673 (1999).
Brown et al., "Organoboranes for synthesis. 9. Rapid reaction of organoboranes with iodine under the influence of base. A convenient procedure for the conversion of alkenes into iodides via hydroboration," Tetrahedron, vol. 44, No. 10, pp. 2751-2762 (1988).
Cannon Instrument Company, "Cannon Catalog 2007-2008: Innovations in Viscosity Measurement," pp. 1-74.
Cardineau et al., "EUV Resists based on Tin-Oxo Clusters," Proc. of SPIE, Advances in Patterning Materials and Processes XXXI, vol. 9051, pp. 90511B-1-90511B-12 (2014).
Cardineau et al., "Photolithographic properties of tin-oxo clusters using extreme ultraviolet light (13.5 nm)," Microelectronic Engineering, vol. 127, pp. 44-50 (2014).
Cochran et al., "Kinetics of the Protodestannylation of Vinyltrialkyltins and Substituted Vinyltrialkyltins," Organometallics, vol. 1, No. 4, pp. 586-590 (1982).
Del Re et al., "Low-LER Tin Carboxylate Photoresists using EUV," Extreme Ultraviolet (EUV) Lithography VI, Proc. of SPIE, vol. 9422 (2015).
Eujen et al., "Preparation and Properties of Trifluoromethyl-Substituted Stannanes," J. Organomet. Chem., vol. 434, No. 2, pp. 159-168 (1992) (Abstract Only).
Fallica et al., "Absorption coefficient and exposure kinetics of photoresists at EUV," Proc. of SPIE, vol. 10143, pp. 101430A-1-101430A-11 (2017).
Haitjema et al., "Extreme ultraviolet patterning of tin-oxo cages," Journal of Micro/Nanolithography, MEMS, and MOEMS, vol. 16, No. 3, pp. 033510-1-033510-8 (2017).
Hánssgen et al., "Synthese der ersten mono-t-butylzinn-elementverbindungen," Journal of Organometallic Chemistry, vol. 293, pp. 191-195 (1985).
International Search Report and Written Opinion issued Jun. 10, 2022 in International Application No. PCT/US2021/056936.
Jones et al., "Amino-derivatives of Metals and Metalloids. Part I. Preparation of Aminostannanes, Stannylamines, and Stannazanes," J. Chem. Soc., pp. 1944-1951 (1965).
Jousseaume et al., "General Routes to Functional Organotin Trichlorides and Trialkoxides Involving the Tricyclohexylstannyl Group," Organometallics, vol. 14, pp. 685-689 (1995).
Khrustalev et al., "New stable germylenes, stannylenes, and related compounds. 8. Amidogermanium(II) and -tin (II) chlorides R2N-E14-CI (E14 = Ge, R = Et; E14 = Sn, R = Me) revealing new structural motifs," Applied Organometallic Chemistry, vol. 21, pp. 551-556 (2007).
Lorberth, J., "Spaltung der zinn-stickstoff-bindung: (dialkylamino)-stannane und ihre reaktionen mit alkylierungsmitteln," Journal of Organometallic Chemistry, vol. 16, No. 2, pp. 235-248 (1969).
Molloy, K. C., "Precursors for the formation of tin(IV) oxide and related materials," Journal of Chemical Research, pp. 549-554 (2008).
Office Action issued Feb. 11, 2022 in U.S. Appl. No. 17/512,944, by Arkles.
Office Action issued Mar. 15, 2023 in TW Application No. 110141022 (partial translation).
Pigarev et al., "The effect of substituents on the structure and reactivity of organogermanium anions," Journal of Organometallic Chemistry, vol. 369, pp. 29-41 (1989).
Sakai et al., "Progress in metal organic cluster EUV photoresists," J. Vac. Sci. Technol. B, vol. 36, No. 6, pp. 06J504-1-06J504-3 (2018).
Search Report issued Aug. 19, 2022 in TW Application No. 110141022.
Search Report issued Mar. 9, 2023 in TW Application No. 110141022.
Seyferth, D., "The Grignard Reagents," Organometallics, vol. 28, No. 6, pp. 1598-1605 (2009).
Stanley et al., "Atmospheric pressure chemical vapour deposition of fluorine-doped tin(IV) oxide from fluoroalkyltin precursors," Applied Organometallic Chemistry, vol. 19, pp. 644-657 (2005).
Tansjo, L., "N-Substituted Alkyltriaminosilanes," ACTA Chemica Scandinavica, vol. 11, No. 10, pp. 1613-1621 (1957).
Tuyen et al., "Nanomechanical and Material Properties of Fluorine-Doped Tin Oxide Thin Films Prepared by Ultrasonic Spray Pyrolysis: Effects of F-Doping," Materials, vol. 12, No. 10, 1665, pp. 1-12 (2019).
Van Den Berghe et al., "A study of the 1H and 119Sn NMR spectra of (CH3)4-nSn(NR2)n compounds (R=CH3, C2H5)," Journal of Organometallic Chemistry, vol. 61, pp. 197-205 (1973).
Van Mol, A.M.B., "Chemical vapour deposition of tin oxide thin films," Ph.D. Thesis, Eindhoven University of Technology, pp. 1-176(2003).
Warner E., "Atomic Layer Deposition of Tin Oxide and Zinc Tin Oxide: Understanding the Reactions of Alkyl Metal Precursors with Ozone," A Dissertation Submitted to the Faculty of University of Minnesota, pp. i-139 (2014).
Wiley-VCH Verlag GmbH & Co. KGaA, "Distillates (petroleum)(, hydrotreated light," The MAK Collection for Occupational Health and Safety, pp. 1791-1803 (2016).
Zhang et al., "The characterization of fluorine doped tin oxide films by Fourier Transformation Infrared spectrum," Materials Letters, vol. 64, pp. 2707-2709 (2010).
Zuiderweg, F.J., "Laboratory Manual of Batch Distillation," Interscience Publishers, Inc., pp. v-viii, 1 and 74-97 (1957).
Graf, G., "Tin, Tin Alloys, and Tin Compounds," Ullmann's Encyclopedia of Industrial Chemistry, vol. 37, pp. 1-34 (2012).
Jaumier et al., "New route to monoorganotin oxides and alkoxides from trialkynylorganotins," Chem. Commun., vol. 3, pp. 369-370 (1998).
Jaumier et al., "Transmetalation of Tetraalkynyltin Compounds with Grignard Reagents: Access to Mono- and Dialkyltin Products," Angew. Chem. Int. Ed., vol. 38, No. 3, pp. 402-404 (1999).
Lappert et al., "Subvalent group 14 metal compounds; XI. Oxidative addition reactions of organic halides or acid anhydrides (including CH4-nCln, PhBr, BrN(SiMe3)2, ButCOCI, or (CF3CO)2O) to some bivalent group 14 metal amides or alkyls," Journal of Organometallic Chemistry, vol. 330, pp. 31-46 (1987).
Mayo, J., "5 Reasons your Process Could Benefit from Glass-Lined Steel Equipment," De Dietrich Process Systems, pp. 1-7 (2013).

(56) References Cited

OTHER PUBLICATIONS

Office Action issued Nov. 29, 2024 in U.S. Appl. No. 18/389,294, by Yang et al.
Wilkins, T., "Four Key Advantages of Using Stainless Steel IBCs in the Industrial Chemical Industry," Metano Tote Talk Blog (2017).
Accession No. 1995:174817, Chemical Abstract Service, CAPLUS databse (published in 1995; retrieved on Jan. 25, 2025) (1995).
International Preliminary Report on Patentability issued Dec. 12, 2024 in Int'l Application No. PCT/US2023/024227.
Office Action issued Jan. 2, 2025 in U.S. Appl. No. 18/420,894, by Yang et al.
Office Action issued Jan. 30, 2025 in U.S. Appl. No. 18/243,318, by Yang et al.
Ribot et al., "Sol-Gel Synthesis of Hybrid Organic-Inorganic Tin Oxide Based Materials," Mat. Res. Soc. Symp. Proc., vol. 346, pp. 121-126 (1994).
International Search Report and Written Opinion issued Jan. 16, 2024 in Int'l Application No. PCT/US2023/030045.
Pratihar et al., "Reactivity and Selectivity of Organotin Reagents in Allylation and Arylation: Nucleophilicity Parameter as a Guide," Organometallics, vol. 30, No. 12, pp. 3257-3269 (2011).
Office Action issued Mar. 26, 2024 in TW Application No. 112130357.
Office Action issued Apr. 8, 2024 in TW Application No. 112120747.
Office Action issued Oct. 26, 2023 in U.S. Appl. No. 18/232,945 by Yang et al.
Furniss et al., "Vogel's Textbook of Practical Organic Chemistry: Experimental Techniques," John Wiley & Sons, Inc., New York, pp. 169-190 (1989).
International Search Report and Written Opinion issued Feb. 5, 2024 in Int'l Application No. PCT/US2023/033801.
Office Action issued Mar. 8, 2024 in U.S. Appl. No. 18/205,009 by Yang et al.
Agur et al., "Organic Derivatives of Tin: Part VIII—Some Insertion Reactions Across Sn—O Bond," Indian Journal of Chemistry, vol. 12, pp. 1193-1196 (1974).
Courtenay et al., "Phosphinimido Complexes of Silicon, Tin, and Germanium," Organometallics, vol. 22, No. 4, pp. 818-825 (2003).
Decision issued Apr. 22, 2025 in TW Application No. 112130357.
Declaration of Dr. Drew Hood in IRP2025-00267 (*Entegris, Inc.* v. *Inpria Corp*, U.S. Pat. No. 11,673,903 )Dec. 10, 2024) (Year: 2024).
Fouquet et al., "Synthesis of monoorganotins and their use as versatile reagents for organic synthesis," Bulletin de la Societe Chimique de France, vol. 134, Nos. 10 & 11, 959-967 (1997).
Gaur et al., "Organic Derivatives of Tin; V Synthesis and Reactions of Alkyltin Trialkoxides," Journal of Organometallic Chemistry, vol. 63, pp. 221-231 (1973).
International Search Report and Written Opinion issued Jun. 25, 2025 in International Application No. PCT/US2024/057488.
International Search Report and Written Opinion issued Nov. 19, 2024 in International Application No. PCT/JP2024/031129.
International Search Report and Written Opinion issued Nov. 19, 2024 in International Application No. PCT/JP2024/031130.
Lorberth et al., "Untersuchungen an Methylzinn-amiden," Chemische Berichte, vol. 98, No. 2, pp. 520-525 (1965).
Notice of Allowance issued Jun. 30, 2025 in U.S. Appl. No. 18/205,009, by Yang.
Office Action and Examination Search Report issued Jun. 3, 2025 in CA Application No. 3231519.
Office Action and Search Report issued Jul. 4, 2025 in TW Application No. 113141998, with English translation of Search Report.
Office Action issued May 21, 2025 in U.S. Appl. No. 18/821,200, by Hioki.
Office Action issued May 28, 2025 in U.S. Appl. No. 18/420,894, by Yang.
Office Action issued Jun. 3, 2025 in JP Application No. 2024515872.
Office Action issued Jun. 12, 2025 in TW Patent Application No. 113132741.
Office Action issued Jun. 25, 2025 in TW Patent Application No. 113132740.
Ossig et al., "Reactions of a free stannaimine and of base-stabilized stannylenes," Chemische Berichte, vol. 126, No. 10, pp. 2247-2253 (1993) (with English Abstract).
Bonire, J. J., "Reaction of Phenyltin Chlorides with Silver Trifluoroacetate," Polyhedron, vol. 6, No. 3, pp. 397-400 (1987).
International Search Report and Written Opinion issued Aug. 7, 2025 in International Application No. PCT/US2025/014559.
Midha et al., "Some Alkyltin(IV) Trifluoroacetates," Indian Journal of Chemistry, vol. 22A, pp. 211-213 (1983).
International Preliminary Report on Patentability issued Sep. 11, 2025 in Int'l Application No. PCT/JP2024/007675.
International Search Report and Written Opinion issued Sep. 12, 2025 in International Application No. PCT/US2025/017130.
International Search Report issued May 21, 2024 in International Application No. PCT/JP2024/007675.
Office Action and Search Report issued Sep. 19, 2025 in TW Application No. 114104119.
Office Action issued Jan. 6, 2026 in JP Application No. 2024515872.
Office Action issued Feb. 6, 2026 in Canadian Application No. 3257557.
Office Action issued Aug. 22, 2025 in TW Application No. 113145825.
Office Action issued Oct. 14, 2025 in JP Application No. 2024571027.
Office Action issued Nov. 19, 2025 in KR Application No. 1020247011428.
Office Action issued Nov. 26, 2025 in EP Application No. 23736499.7.
International Search Report and Written Opinion issued Mar. 25, 2025, in International Application No. PCT/US2024/045360.
International Search Report and Written Opinion issued Apr. 11, 2025 in International Application No. PCT/US2024/054069.
International Search Report and Written Opinion issued May 8, 2025 in International Application No. PCT/US2024/061753.
International Search Report and Written Opinion issued May 9, 2025 in International Application No. PCT/US2024/061775.
Notice of Allowance issued Dec. 25, 2024 in TW Application No. 112120747.
Office Action issued Mar. 21, 2025 in U.S. Appl. No. 18/821,070, by Hioki.
Office Action issued May 14, 2025 in U.S. Appl. No. 18/196,579, by Arkles.
Partial International Search Report issued May 2, 2025 in International Application No. PCT/US2024/057488.

* cited by examiner

IODOALKYL TIN COMPOUNDS AND PREPARATION METHODS THEREOF

CROSS-REFERENCE TO RELATED APPLICATIONS

This application claims priority to U.S. Provisional Application No. 63/410,692, filed Sep. 28, 2022, and U.S. Provisional Application No. 63/411,681, filed Sep. 30, 2022, the disclosures of which are herein incorporated by reference in their entireties.

BACKGROUND OF THE INVENTION

As semiconductor fabrication continues to advance, feature sizes continue to shrink, driving the need for new processing methods. Certain organotin compounds have been shown to be useful in the deposition of tin oxide hydroxide coatings in applications such as extreme ultraviolet (EUV) lithography techniques. Iodine has a particularly high cross section in the EUV range, which is due to delayed absorption by its 4 d orbital. As a result, iodine-substituted compounds have been shown to exhibit much higher photoelectron spectrum intensity caused by the existence of core levels at favorable energy position and the formation of photoelectrons with favor low electron energies. (*Nanomaterials* 10, 1593 (2020)). Iodine-substituted alkyl tin compounds have drawn high attention as EUV photoresist candidates which can be used to pattern structures lithographically.

Known methods for preparing iodoalkyl tin compounds inevitably lead to mixtures of different products, and the ability to prepare and isolate iodoalkyl tin compounds having desired purity levels has not previously been reported. Such tin compounds would be very attractive for use in the microelectronic industry.

SUMMARY OF THE INVENTION

In one embodiment, aspects of the disclosure relate to an iodoalkyl tin trialkoxide compound having formula (1):

$$R'Sn(OR)_3 \qquad (1)$$

wherein R' is a primary or secondary iodoalkyl group having about 2 to about 10 carbon atoms and containing at least one iodine atom and R is a primary, secondary, or tertiary alkyl group having about 1 to about 5 carbon atoms.

In a second embodiment, aspects of the disclosure relate to a diiodoalkyl tin trialkoxide compound having formula (2):

$$R''Sn(OR)_3 \qquad (2)$$

wherein R" is a primary or secondary iodoalkyl group having about 2 to about 10 carbon atoms and containing two iodine atoms and R is a primary, secondary, or tertiary alkyl group having about 1 to about 5 carbon atoms.

In a third embodiment, aspects of the disclosure relate to a method of synthesizing an iodoalkyl tin trialkoxide compound having formula (1):

$$R'Sn(OR)_3 \qquad (1)$$

wherein R' is a primary or secondary iodoalkyl group having about 2 to about 10 carbon atoms and containing at least one iodine atom and R is a primary, secondary, or tertiary alkyl group having about 1 to about 5 carbon atoms, the method comprising:

(a) providing a solution of an alkenyl tin trichloride;
(b) adding a borane solution;
(c) adding solid iodine or an iodine solution; and
(d) adding a solution of an alkali metal alkoxide to yield a product containing an iodoalkyl tin trialkoxide having formula (1).

In a fourth embodiment, aspects of the disclosure relate to a method of synthesizing a diiodoalkyl tin trialkoxide compound having formula (2):

$$R''Sn(OR)_3 \qquad (2)$$

wherein R" is a primary or secondary iodoalkyl group having about 2 to about 10 carbon atoms and containing two iodine atoms and R is a primary, secondary, or tertiary alkyl group having about 1 to about 5 carbon atoms, the method comprising:

(a) providing a solution of an alkenyl tin trialkoxide; and
(b) adding solid iodine or an iodine solution to yield a product containing a diiodoalkyl tin trialkoxide having formula (2).

In a fifth embodiment, aspects of the disclosure relate to an iodoalkyl tin trialkoxide compound having formula (1):

$$R'Sn(OR)_3 \qquad (1)$$

wherein R' is a primary or secondary iodoalkyl group having about 2 to about 10 carbon atoms and containing at least one iodine atom and R is a primary, secondary, or tertiary alkyl group having about 1 to about 5 carbon atoms, wherein the compound having formula (1) is produced by a method comprising:

(a) providing a solution of an alkenyl tin trichloride;
(b) adding a borane solution;
(c) adding solid iodine or an iodine solution; and
(d) adding a solution of an alkali metal alkoxide to yield a product containing an iodoalkyl tin trialkoxide having formula (1).

In a sixth embodiment, aspects of the disclosure relate to a diiodoalkyl tin trialkoxide compound having formula (2):

$$R''Sn(OR)_3 \qquad (2)$$

wherein R" is a primary or secondary iodoalkyl group having about 2 to about 10 carbon atoms and containing two iodine atoms and R is a primary, secondary, or tertiary alkyl group having about 1 to about 5 carbon atoms, wherein the compound having formula (2) is produced by a method comprising:

(a) providing a solution of an alkenyl tin trialkoxide; and
(b) adding solid iodine or an iodine solution to yield a product containing a diiodoalkyl tin trialkoxide having formula (2).

DETAILED DESCRIPTION OF THE INVENTION

According to one aspect of the disclosure, provided are iodoalkyl tin trialkoxide compounds represented by formula (1). In a preferred embodiment, the compounds having formula (1) have a purity of at least about 99 mol %, as described in more detail below. In a preferred embodiment, the compounds having formula (1) contain minimal amounts of bisiodoalkyl tin compounds having formula (3) relative to the total amount of tin, such as less than about 1 mol %.

$$R'Sn(OR)_3 \qquad (1)$$

$$R'_2Sn(OR)_2 \qquad (3)$$

In formulas (1) and (3), R' is a primary or secondary iodoalkyl group having about 2 to about 10 carbon atoms and containing at least one iodine atom and R is a primary, secondary, or tertiary alkyl group having about 1 to about 5 carbon atoms. Preferably, R' contains about 2 to about 6 carbon atoms, more preferably about 2 to about 3 carbon atoms, and is most preferably iodoethyl, iodopropyl, or iodoisopropyl, and R may be a primary, secondary, or tertiary alkyl group such as ethyl, propyl, isopropyl, t-butyl, or t-pentyl. In preferred embodiments R' contains at least one iodine atom substituted on a terminal carbon atom. In preferred embodiments, R' contains at least one iodine atoms substituted on a carbon atom which is at least two carbon atoms away from the tin atom. In preferred embodiments, R' contains at least two iodine atoms. In preferred embodiments, the at least two iodine atoms are on vicinal (adjacent) carbon atoms.

In another aspect of the disclosure, provided are diiodoalkyl tin trialkoxide compounds represented by the chemical formula (2). In a preferred embodiment, the compounds having formula (2) have a purity of at least about 99 mol %, as described in more detail below. In a preferred embodiment, the compounds having formula (2) contain minimal amounts of bisdiiodoalkyl tin compounds having formula (4) relative to the total amount of tin, such as less than about 1 mol %.

$R''Sn(OR)_3$ (2)

$R''_2Sn(OR)_2$ (4)

In formulas (2) and (4), R" is a primary or secondary diiodoalkyl group having about 2 to about 10 carbon atoms and two iodine atoms and R is a primary, secondary, or tertiary alkyl group having about 1 to about 5 carbon atoms. Preferably, R" contains about 2 to about 6 carbon atoms, more preferably about 2 to about 3 carbon atoms, and is most preferably diiodoethyl, diiodopropyl, or diiodoisopropyl and R can be a primary, secondary, or tertiary alkyl group such as ethyl, propyl, isopropyl, t-butyl, or t-pentyl. In preferred embodiments R" contains at least one iodine atom substituted on a terminal carbon atom. In preferred embodiments, R" contains at least one iodine atoms substituted on a carbon atom which is at least two carbon atoms away from the tin atom. In preferred embodiments, the at least two iodine atoms in R" are on vicinal (adjacent) carbon atoms.

Further aspects of the disclosure relate to methods for producing iodoalkyl tin trialkoxide compounds represented by formula (1) and to compounds having formula (1) produced by the method. In a preferred embodiment, the compounds having formula (1) contain minimal bisiodoalkyl tin compounds having formula (3) relative to the total amount of tin, such as less than about 1 mol %.

$R'Sn(OR)_3$ (1)

$R'_2Sn(OR)_2$ (3)

In formulas (1) and (3), R' is a primary or secondary iodoalkyl group having about 2 to about 10 carbon atoms and at least one iodine atom and R is a primary, secondary, or tertiary alkyl group having about 1 to about 5 carbon atoms as previously described. Preferably, R' is iodoethyl, iodopropyl, or iodoisopropyl and R may be a primary, secondary, or tertiary alkyl group such as ethyl, propyl, isopropyl, t-butyl, or t-pentyl.

Other aspects of the disclosure relate to methods for producing diiodoalkyl tin trialkoxide compounds represented by the chemical formula (2) and to compounds having formula (2) produced by the method. In a preferred embodiment, the compounds having formula (2) contain minimal bisdiiodoalkyl tin compounds having formula (4) relative to the total amount of tin, such as less than about 1 mol %.

$R''Sn(OR)_3$ (2)

$R''_2Sn(OR)_2$ (4)

In formulas (2) and (4), R' is a primary or secondary diiodoalkyl group having about 2 to about 10 carbon atoms and two iodine atoms and R is a primary, secondary, or tertiary alkyl group having about 1 to about 5 carbon atoms as previously described. Preferably, R' is diiodoethyl, diiodopropyl, or diiodoisopropyl and R can be a primary, secondary, or tertiary alkyl group such as ethyl, propyl, isopropyl, t-butyl, or t-pentyl.

Exemplary compounds having formulas (1) and (2) contain iodoethyl, diiodoethyl, iodoisopropyl, and diiodoisopropyl substituents, as shown below, where X is an OR group. Preferred compounds having formulas (1) and (2) have at least one terminal iodine atom, which provides suitable reactivity for EUV lithography. Preferably, the carbon atom containing the iodine substitution is more than two carbon atoms removed from the tin atom, as this provides high stability. Diiodoalkyl tin trialkoxide compounds are more preferred due to higher sensitivity for EUV light exposure.

(1)

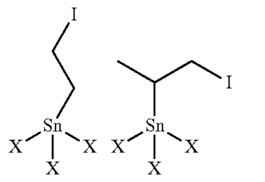

(2)

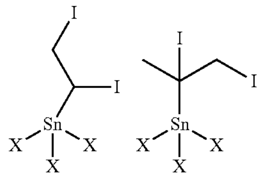

In preferred embodiments, the compounds having formulas (1) and (2) have high purity, such as those having purities of greater than about 95 mol %, greater than about 97 mol %, greater than about 98 mol %, greater than about 99 mol %, or even higher. These compounds contain low or minimal levels of, or, in some embodiments, are substantially free of, bisiodoalkyl and bisdiiodoalkyl tin compounds having formulas (3) and (4), respectively, which may, in some embodiments, be as low as 1 mol %, such as less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, or less than about 0.1 mol %. All numerical ranges expressed in this disclosure encompass all values within the range, including fractional and decimal amounts.

For the purposes of this disclosure, the term "high purity" may be understood to mean a purity greater than about 99 mol %, more preferably greater than about 99.2 mol %, even more preferably greater than about 99.3 mol %. The term "substantially free" may be understood to mean that the impurity is not detectable by $^{119}Sn$ NMR, which can have detection limits as low as 0.05 mol % when testing the sample without dilution in deuterated solvent.

$^{119}Sn$ NMR spectroscopy is ideally suited to the quantitative analysis of iodoalkyl tin compounds due to its high sensitivity to small structural changes and large spectral range of 6500 ppm (see Davies et al., Eds.; *Tin Chemistry: Fundamentals, Frontiers, and Applications*; Wiley (2008)). This allows for easy identification and quantification of iodoalkyl tin compounds and their impurities because $^{119}Sn$ resonances are highly resolved. $^{119}Sn$ NMR suffers from reduced sensitivity compared to other analytical methods such as GC, HPLC, or $^{1}H$ NMR. To improve sensitivity, iodoalkyl tin compounds are analyzed without dilution, and a large number of spectral acquisitions (2000+) are acquired to measure the low levels of impurities described in this work. Using this approach, detection limits of 500 ppm diiodoalkyl tin dialkoxides can be achieved.

The $^{119}Sn$ NMR data described herein were obtained using a method similar to the relative purity method described in *J. Med. Chem.* (57, 22, 9220-9231 (2014)). $^{119}Sn$ NMR spectra were acquired using inverse-gated $^{1}H$ decoupling with a 40° pulse, one second relaxation delay, and sufficient scans to achieve the required sensitivity. Samples were prepared without dilution in deuterated solvent. Quantitation was performed by integrating all peaks in the spectrum and setting the total peak area to 100. Each peak in the spectrum represents a distinct tin compound and the area of each peak represents the concentration or purity of that compound in mol %.

In some embodiments, the compounds having formula (1) and formula (2) have a total content of tetrakis(dialkoxy)tin of less than about 1 mol %, a total content of distannane compounds of less than about 1 mol %, and/or a content of tetraiodoalkyl tin of less than about 1 mol %. These contents may each independently be less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, or even lower.

The organometallic tin compounds having formulas (1) and (2) may be used for the formation of high-resolution EUV lithography patterning precursors and are attractive due to their purity and minimized concentrations of bisiodoalkyl and bisdiiodoalkyl impurities having formulas (3) and (4), respectively, as well as additional impurities.

Methods of Synthesis

Aspects of the disclosure relate to methods for synthesizing the iodoalkyl and diidoalkyl tin compounds having formula (1) and (2) described above which are suitable for use in the microelectronic industry. These compounds may be prepared in high purity, such as those having purities of greater than about 95 mol %, greater than about 97 mol %, greater than about 98 mol %, greater than about 99 mol %, or even higher. These compounds contain low or minimal levels of, or, in some embodiments, are substantially free of, bisiodoalkyl and bisdiiodoalkyl tin compounds having formulas (3) and (4), respectively, which may, in some embodiments, be as low as 1 mol %, such as less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, or even lower.

In some embodiments, the compounds having formula (1) and formula (2) have a total content of tetrakis(dialkoxy)tin of less than about 1 mol %, a total content of distannane compounds of less than about 1 mol %, and/or a content of tetraiodoalkyl tin of less than about 1 mol %. These contents may each independently be less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, or even lower.

Methods for preparing iodoalkyl tin trialkoxide compounds having formula (1) in high yield involve the hydroboration-iodination of the corresponding alkenyl-substituted tin trichloride followed by reaction with a base. For example, appropriate starting materials include vinyl tin trichloride, allyl tin trichloride, isopropenyl tin trichloride, etc.; the double bond in the alkenyl substituent must be in the terminal position with respect to tin. Hydroboration followed by iodination of the alkene results in the formation of an organoborane and then an anti-Markovnikov hydroiodination so that the iodine in the alkyl iodide substituent is in the terminal position with respect to tin. As explained below, appropriate borating agents include, without limitation, borane ($BH_3$) and disiamylborane ((bis(1,2-dimethylpropyl) borane, $Sia_2BH$), which has been found to result in a more quantitative hydroiodination in the second step. Finally, the chlorine substituents on the tin are converted to alkoxy groups via reaction with a base in the presence of an alcohol, such as methanol for formation of a tin trimethoxide compound. Appropriate bases include alkali metal alkoxides, such as the presently preferred sodium t-butoxide.

Methods for preparing diiodoalkyl tin trialkoxide compounds having formula (2) in high yield involve the direct iodination of the corresponding alkenyl-substituted tin trialkoxide in the presence of acetonitrile or an alcohol. For example, appropriate starting materials include vinyl tin trialkoxide, allyl tin trialkoxide, isopropenyl tin trialkoxide, etc.; iodination of the alkene results in the formation of a diiodoalkyl group.

A method for preparing an iodoalkyl tin trialkoxide compound having formula (1) according to aspects of the disclosure involves the following steps, each of which is described in further detail below:

(a) providing a solution of an alkenyl tin trichloride;
(b) adding a borane solution;
(c) adding solid iodine or an iodine solution; and
(d) adding an alcoholic solution of an alkali metal alkoxide to yield a product containing iodoalkyl tin trialkoxide having formula (1).

While the order of steps is preferably (a), (b), (c), and then (d) to avoid side reactions, it is also within the scope of the disclosure to perform step (d) between steps (a) and (b).

The first step involves preparing a solution of an alkenyl tin trichloride preferably in an ether solvent such as THF or diethyl ether. The appropriate alkenyl tin trichloride is determined by the desired final product, and may include, for example, vinyl tin trichloride, allyl tin trichloride, isopropenyl tin trichloride, etc.; the double bond in the alkenyl substituent must be in the terminal position with respect to tin.

The concentration of the alkenyl tin trichloride in the solution is preferably up to about 30 wt %, more preferably up to about 20 wt %, even more preferably up to about 15 wt %, and preferably greater than about 1 wt %, greater than about 2 wt %, greater than about 3 wt %, even more preferably greater than about 5 wt %. It has been found that this dilute concentration provides effective control of the reaction temperature and solubility of the alkenyl tin trichloride. On the other hand, the productivity is lower in dilute concentrations in industrial conditions.

In the second step, a solution of a borane such as $BH_3$ or disiamylborane is added to the alkenyl tin trichloride solution preferably at a temperature of about 0 to 10° C., preferably in a drop-wise fashion. For example, a 2.0 M. 2.5 M, or 3.0 M solution of borane in THF may be appropriate, but the particular solvent and concentration may be determined based on availability and provided that the desired stoichiometry of borane to alkenyl tin trichloride is achieved. Specifically, the amount of alkenyl tin trichloride is at least about 3 equivalents relative to the amount of hydrides in the borane, such as about 3.05 equivalents, about 3.10 equivalents, about 3.15 equivalents, etc. If the borane is $BH_3$, it is provided in a 1:3 molar ratio relative to the alkenyl tin trichloride, whereas if the borane is disiamylborane, it is provided in an approximately 1:1 molar ratio.

Following the borane addition, the reaction mixture is allowed to slowly warm to room temperature, then stirred for an additional time period at room temperature, such as for about 2 hours. It is within the scope of the disclosure to add an alcohol such as t-butanol at this stage to destroy traces of residual hydride. Next, solid iodine or an iodine solution is added, followed by a dropwise addition of an alkali metal alkoxide, such as sodium t-butoxide, in an alcohol, such as t-butanol, preferably dropwise over about a one-hour period at about 0 to 10° C., yielding a product containing iodoalkyl tin trialkoxide having formula (1).

The molar amount of iodine ($I_2$) relative to alkenyl tin trichloride is preferably greater than about 0.9 equivalents, or greater than about 1.0 equivalents, and less than about 2.0 equivalent, less than about 1.8 equivalents, less than about 1.6 equivalents, more preferably less than about 1.4 equivalents. If the amount of iodine is too low, starting materials may remain. Also, the reaction speed may be too low and the amount of impurities may increase due to side reactions such as redistribution. If the amount of iodine is too high, overreaction may occur and increase poly-iodine-substituted byproducts.

If the iodine is used in solution, the solvent is preferably an ether solvent, such as THF or diethyl ether, or an alcohol, such as t-butanol. The concentration of the iodine is preferably up to about 30 wt %, more preferably up to about 20 wt %, or up to about 15 wt % and preferably greater than about 1 wt %, greater than about 2 wt %, greater than about 3 wt %, even more preferably greater than about 5 wt %. It has been found that this dilute concentration provides effective control of the reaction temperature. On the other hand, the productivity is lower in dilute concentrations in industrial conditions.

Finally, the crude mixture is extracted, such as with hexanes, and the solvents are removed under vacuum to produce a crude product which is distilled, preferably under vacuum, to produce the desired compound having formula (1). Specifically, the crude product may be distilled at about 1 torr, discarding any distillate before the boiling point of the iodoalkyl tin trialkoxide having formula (1), and collecting only the distillate obtained at the boiling point of the iodoalkyl tin trialkoxide having formula (1) to yield a product containing iodoalkyl tin trialkoxide having formula (1). Appropriate distillation conditions may be determined by routine experimentation depending on the specific iodoalkyl tin trialkoxide compound.

A method for preparing a diiodoalkyl tin trialkoxide compound having formula (2) according to aspects of the disclosure involves the following steps, each of which is described in further detail below:

(a) providing a solution of an alkenyl tin trialkoxide; and
(b) adding solid iodine or an iodine solution to yield a product containing diiodoalkyl tin trialkoxide having formula (2).

The first step involves preparing a solution of an alkenyl tin trialkoxide, preferably in an acetonitrile or an alcohol solvent. The appropriate alkenyl tin trialkoxide is determined by the desired final product, and may include, for example, vinyl tin trialkoxide, allyl tin trialkoxide, isopropenyl tin trialkoxide, etc. The alkenyl tin trialkoxide may be obtained by known methods. If an alcohol is employed as a solvent, the particular alcohol is determined by the alkoxide which is employed. For example, if the alkoxide is vinyl tin trialkoxide, appropriate alcohols include, without limitation, methanol, ethanol, isopropanol, t-butanol, and 2-methylbutan-2-ol.

The concentration of the alkenyl tin trialkoxide in the solution is preferably up to about 30 wt %, more preferably up to about 20 wt %, or up to about 15 wt % and preferably greater than about 1 wt %, greater than about 2 wt %, greater than about 3 wt %, even more preferably greater than about 5 wt %. It has been found that this dilute concentration provides effective control of the reaction temperature and solubility of the alkenyl tin trichloride. On the other hand, the productivity is lower in dilute concentrations in industrial conditions.

In the second step, solid iodine or an iodine solution is added to the solution preferably at a temperature of about 0° C. to about 10° C. at a ratio of about 1:1 relative to the amount of alkenyl tin trialkoxide. Following the addition, the reaction mixture is allowed to warm to room temperature and stirred for an additional period of time until the yellow color has disappeared, thereby yielding a product containing diiodoalkyl tin trialkoxide having formula (2).

If the iodine is used in solution, the solvent is preferably an ether solvent, such as THF or diethyl ether, or an alcohol, such as t-butanol. The concentration of the iodine is preferably up to about 30 wt %, more preferably up to about 20 wt %, or up to about 15 wt % and preferably greater than about 1 wt %, greater than about 2 wt %, greater than about 3 wt %, even more preferably greater than about 5 wt %. It has been found that this dilute concentration provides effective control of the reaction temperature. On the other hand, the productivity is lower in dilute concentrations in industrial conditions.

Preferably, the acetonitrile, alcohol, and/or ether solvents are removed under vacuum to produce a crude product which is distilled, preferably under vacuum, to produce the desired compound having formula (2). Specifically, the crude product is distilled at about 1 torr, discarding any distillate before the boiling point of the diiodoalkyl tin trialkoxide having formula (2), and collecting only the distillate obtained at the boiling point of the diiodoalkyl tin trialkoxide having formula (2) to yield a product containing diiodoalkyl tin trialkoxide having formula (2). Appropriate distillation conditions may be determined by routine experimentation depending on the specific iodoalkyl tin trialkoxide compound.

All of the method steps for the syntheses of the compounds having formula (1) and formula (2) are preferably performed substantially without light exposure which has detrimental effects on the iodoalkyl tin trialkoxide compounds; the iodoalkyl structure is easy decomposed by exposure to light. Shielding may be accomplished by any method known in the art such as, for example, employing light-shielded containers such as amber glass, metal (SUS) containers, wrapping the container with a light-shielding cover such as cloth, foil or film, using light-shielding coatings, or performing the reactions in a dark room.

The distillations may be performed using a stainless steel column packed with a stainless steel packing material.

Alternatively, the distillations may be performed in a light-shielded apparatus comprising glass such as glass equipment, glass-lined equipment, glass-coated equipment, etc. Shielding may be accomplished by any method known in the art such as, for example, employing light-shielded containers such as amber glass, metal (SUS) containers, wrapping the container with a light-shielding cover such as cloth, foil or film, using light-shielding coatings, or performing the distillation in a dark room.

Further aspects of the disclosure relate to a solution containing an organic solvent as described herein and a composition containing organotin compounds having formula (1) and formula (2), which may, in some embodiments, be obtained by hydrolysis of a monoorgano tin compound having formula (1) as described herein. Additional aspects of the disclosure relate to films prepared from or containing a composition containing organotin compounds having formula (1) and (2).

The compounds described herein may be used as resist materials after hydrolysis or other reactions such as those known in the art. The compounds described herein may contain a group which is capable of forming an alkyltin oxo-hydroxo-patterning composition which may be hydrolyzed with water or other suitable reagents under suitable conditions to form an alkyltin oxo-hydroxo-patterning composition which may be represented by the formula $R'SnO_{(3/2-x/2)}(OH)_x$ ($0<x\leq3$). Hydrolysis and condensation reactions that may relate to a compound with hydrolytic groups (X) are shown in the following reactions:

$$RSnX_3+3H_2O\rightarrow RSn(OH)_3+3HX$$

$$RSn(OH)_3\rightarrow RSnO_{(1.5-(x/2))}OHx+(x/2)H_2O$$

Alkyl oxohydroxy tin compounds obtained by hydrolysis using a composition containing $R'SnX_3$ compounds as described above as raw material and the oxohydroxy tin compounds represented by the formula $R'SnO_{(3/2-x/2)}(OH)_x$ ($0<x\leq3$) may be used as an EUV resist material.

A method for obtaining oxohydroxy tin compounds (R'SnO) by hydrolyzing a composition containing a $R'SnX_3$ compound may involve, for example, volatilizing a composition containing a $R'SnX_3$ compound under heating or reduced pressure, and reacting the vapor generated by volatilizing the composition on a substrate on which the tin composition is deposited, with water vapor, etc. (a dry method). In this method, a thin film containing the tin compound R'SnO may be formed on the substrate.

Another method may involve reacting a composition containing a $R'SnX_3$ compound in solution or in a solid state with water, etc., and hydrolyzing it to obtain the oxohydroxy tin compounds (R'SnO). The oxohydroxy tin compounds (R'SnO) may then be used as a coating solution by dissolving it in an organic solvent, for example. The organic solvent is not limited, however in particular, suitable solvents include, for example, aromatic compounds (e.g., xylenes, toluene), ethers (anisole, tetrahydrofuran), esters (propylene glycol monomethyl ether acetate, ethyl acetate, ethyl lactate), alcohols (e.g., 4-methyl-2-propanol, 1-butanol, methanol, isopropyl alcohol, 1-propanol), ketones (e.g., methyl ethyl ketone), halogen solvents (e.g., $CH_2Cl_2$, $CHCl_3$) and mixtures thereof. In general, organic solvent selection may be influenced by solubility parameters, volatility, flammability, toxicity, viscosity and potential chemical interactions with other processing materials.

The solution may be applied to a substrate by any coating or printing technique, and a thin film or coating containing oxohydroxy tin compounds (R'SnO) may be formed on the substrate. After the components of the solution are dissolved and combined, the character of the species may change as a result of partial hydration and condensation, especially during the coating process.

The thin film obtained by any of the above methods may be stabilized or partially condensed prior to light irradiation through drying, heating, or other processes. Generally, thin films or coatings have an average thickness of less than about 10 microns, and very thin submicron thin films, e.g., less than about 100 nanometers (nm), even less than about 50 nm or less than about 30 nm, may be desirable for patterning very small features. The resulting thin film or coating may be called a resist because the exposure processes a portion of the composition to be resistant to development/etching.

The thin or coating may be exposed to appropriate radiation, (e.g., extreme ultraviolet, electron beam, deep ultraviolet, or ultraviolet), using a selected pattern or negative portion of the pattern to form a latent image with developer resistant and developer soluble regions. After exposure to the appropriate radiation and prior to development, the thin film or coating may be heated or otherwise reacted to further differentiate the latent image from the non-irradiated areas. The latent image is brought into contact with the developer to form a physical image, i.e., a patterned thin film or coating. The patterned thin film or coating may be further heated to stabilize the remaining patterned coating on the surface. The patterned coating may be used as a physical mask to perform further processing according to the pattern, e.g., etching of the substrate and/or attachment of additional materials. After the patterned resist is used as requested, the remaining patterned coating may be removed at an appropriate point in the processing, but the patterned coating may also be incorporated into the final structure.

The invention will now be described in connection with the following, non-limiting examples.

Example 1 (Prophetic): Synthesis of 2-Iodoethyl Tin Tri-Tert-Butoxide

Vinyl tin trichloride is prepared according to method of Rosenberg and Gibbons (*Journal of the American Chemical Society,* 79, 2138-40 (1957)) by the redistribution reaction of tetravinyltin and tetrachlorotin. A flask is then charged with 400 mL of anhydrous THF and 189.08 g (0.75 moles) of vinyl tin trichloride and cooled to 0° C. under $N_2$. To the mixture, 25.5 mL (0.25 moles) of neat borane-methyl sulfide are added dropwise over 1 hour. The solution is warmed to room temperature and stirred for an additional two hours. Subsequently, 10 mL tert-butanol are added into the reactor to destroy traces of residual hydride. Under $N_2$, 190.5 g of iodine are added, followed by the dropwise addition of 0.75 moles of sodium tert-butoxide in tert-butanol solution over 30 min. The reaction mixture is stirred overnight, the solvents are removed under vacuum, and the crude product is distilled under vacuum to yield the title compound.

Example 2 (Prophetic): Synthesis of 1,2-Diiodoethyl Tin Tri-Tert-Butoxide

A flask is charged with 400 mL of anhydrous acetonitrile or tert-butanol and 189.08 g (0.75 moles) of vinyl tin tri-tert-butoxide (prepared in-house) and cooled to 0° C. under $N_2$. To this mixture, 0.75 moles of $I_2$ are added. The solution is warmed to room temperature and stirred until the yellow color disappears. The solvents are removed under vacuum, and the crude product is distilled under vacuum to yield the title compound.

Example 3 (Prophetic): Synthesis of 3-Iodoepropyl Tin Tri-Tert-Butoxide

Allyl tin trichloride is prepared according to method of Rosenberg and Gibbons (*Journal of the American Chemical Society,* 79, 2138-40 (1957)) by the redistribution reaction of tetraallyltin and tetrachlorotin. A flask is then charged with 400 mL of anhydrous THF and 189.08 g (0.75 moles) of allyl tin trichloride and cooled to 0° C. under $N_2$. To the mixture, 25.5 mL (0.25 moles) of neat borane-methyl sulfide are added dropwise over 1 hour. The solution is warmed to room temperature and stirred for an additional two hours. Subsequently, 10 mL tert-butanol are added into the reactor to destroy traces of residual hydride. Under $N_2$, 190.5 g of iodine are added, followed by the dropwise addition of 0.75 moles of sodium tert-butoxide in tert-butanol solution over 30 min. The reaction mixture is stirred overnight, the solvents are removed under vacuum, and the crude product is distilled under vacuum to yield the title compound.

Example 4 (Prophetic): Synthesis of 1,2-Diiodopropyl Tin Tri-Tert-Butoxide

A flask is charged with 400 mL of anhydrous acetonitrile or tert-butanol and 189.08 g (0.75 moles) of vinyl tin tri-tert-butoxide (prepared in-house) and cooled to 0° C. under $N_2$. To this mixture 0.75 moles of $I_2$ are added. The solution is warmed to room temperature and stirred until the yellow color disappears. The solvents are removed under vacuum, and the crude product is distilled under vacuum to yield the title compound.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of synthesizing an iodoalkyl tin trialkoxide compound having formula (1):

$$R'Sn(OR)_3 \quad (1)$$

wherein R' is a primary or secondary iodoalkyl group having 2 to 10 carbon atoms and containing at least one iodine atom and R is a primary, secondary, or tertiary alkyl group having 1 to 5 carbon atoms, the method comprising:

(a) providing a solution of an alkenyl tin trichloride;

(b) adding a borane solution;

(c) adding solid iodine or an iodine solution; and (d) adding a solution of an alkali metal alkoxide to yield a product containing an iodoalkyl tin trialkoxide having formula (1).

2. The method according to claim 1, wherein R' is iodoethyl, iodopropyl, or iodoisopropyl and R is ethyl, propyl, isopropyl, t-butyl, or t-pentyl.

3. The method according to claim 1, wherein the compound having formula (1) has a purity of at least about 99 mol %.

4. The method according to claim 1, wherein the compound having formula (1) contains less than about 1 mol % bisiodoalkyl tin dialkoxide having formula (3):

$$R'_2Sn(OR)_2 \quad (3).$$

5. The method according to claim 1, wherein the borane solution is added at about 0° C. to about 10° C.

6. The method according to claim 1, wherein step (c) comprises adding solid iodine.

7. The method according to claim 1, further comprising after step (d):

(e) extracting the reaction mixture and removing the solvents under vacuum to produce a crude product.

8. The method according to claim 7, further comprising after step (e):

(f) distilling the crude product to yield the product containing the iodoalkyl tin trialkoxide having formula (1).

* * * * *